US012719155B2

(12) United States Patent
Göttl et al.

(10) Patent No.: US 12,719,155 B2
(45) Date of Patent: Aug. 25, 2026

(54) MULTI-BAND ANTENNA AND MOBILE COMMUNICATION BASE STATION WITH MODULAR DESIGN

(71) Applicant: Telefonaktiebolaget LM Ericsson (publ), Stockholm (SE)

(72) Inventors: Maximilian Göttl, Frasdorf (DE); Florian Leinenbach, Kolbermoor (DE); Thomas Ettstaller, Bad Aibling (DE); Christoph Staita, Oberaudorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 18/682,179

(22) PCT Filed: Aug. 11, 2021

(86) PCT No.: PCT/EP2021/072392
§ 371 (c)(1),
(2) Date: Feb. 8, 2024

(87) PCT Pub. No.: WO2023/016639
PCT Pub. Date: Feb. 16, 2023

(65) Prior Publication Data
US 2024/0380099 A1 Nov. 14, 2024

(51) Int. Cl.
*H01Q 1/24* (2006.01)
*H01Q 5/42* (2015.01)
(Continued)

(52) U.S. Cl.
CPC ............... *H01Q 1/246* (2013.01); *H01Q 5/42* (2015.01); *H01Q 5/48* (2015.01); *H01Q 19/108* (2013.01);
(Continued)

(58) Field of Classification Search
CPC H01Q 1/246; H01Q 5/40; H01Q 5/42; H01Q 5/48; H01Q 19/10; H01Q 19/108;
(Continued)

(56) References Cited

U.S. PATENT DOCUMENTS 10,008,768 B2 6/2018 Markof et al.
10,122,077 B2 11/2018 Fröhler et al.
(Continued)

FOREIGN PATENT DOCUMENTS

EP 3723193 A1 10/2020
WO 2016015835 A1 2/2016

OTHER PUBLICATIONS

International Search Report and Written Opinion for International Patent Application No. PCT/EP2021/072392, mailed May 6, 2022, 10 pages.

*Primary Examiner* — Robert Karacsony
(74) *Attorney, Agent, or Firm* — Withrow & Terranova, PLLC

(57) ABSTRACT

A multi-band antenna has first radiators, second radiators, a frame and at least one insert. The frame comprises a frame reflector surface, the first radiators are mounted to the frame, and the frame defines at least one window for receiving the at least one insert. The insert comprises a base having an insert reflector surface, the second radiators are mounted to the insert, and the base is located in the at least one window. The frame reflector surface and the insert reflector surface together form a common reflector for the first radiators. Further, a mobile communication base station is shown.

13 Claims, 3 Drawing Sheets

(51) Int. Cl.

| | |
|---|---|
| ***H01Q 5/48*** | (2015.01) |
| ***H01Q 19/10*** | (2006.01) |
| ***H01Q 21/06*** | (2006.01) |
| ***H01Q 25/00*** | (2006.01) |

(52) U.S. Cl.
CPC ......... *H01Q 21/062* (2013.01); *H01Q 25/001* (2013.01)

(58) Field of Classification Search
CPC .... H01Q 21/061; H01Q 21/062; H01Q 21/28; H01Q 25/00; H01Q 25/001; H01Q 25/002
See application file for complete search history.

(56) References Cited

U.S. PATENT DOCUMENTS

| | | | | |
|---|---|---|---|---|
| 2020/0127389 | A1 | 4/2020 | Li et al. | |
| 2021/0218156 | A1 | 7/2021 | Patel et al. | |
| 2021/0305717 | A1* | 9/2021 | Hou ..................... | H01Q 19/185 |

* cited by examiner

MULTI-BAND ANTENNA AND MOBILE COMMUNICATION BASE STATION WITH MODULAR DESIGN

This application is a 35 U.S.C. § 371 national phase filing of International Application No. PCT/EP2021/072392, filed Aug. 11, 2021, the disclosure of which is incorporated herein by reference in its entirety.

TECHNICAL FIELD

The invention concerns a multi-band antenna as well as a mobile communication base station having a multi-band antenna.

BACKGROUND

The requirements for antennas for base stations for radio frequency cellular communication rise constantly, in particular with respect to the number of frequency bands covered by an antenna. Also 2-dimensional arrays are required to serve "multiple input-multiple output" services, known as MIMO. Thus, multi-band antennas are commonly used. In multi-band antennas, two or more types of radiators have to be arranged in respective arrays using as little space as possible together with appropriate feeding networks. Examples for such antennas are, for example, described in WO 2016/015835 A1, U.S. Pat. Nos. 10,008,768 B2 and 10,122,077 B2.

These antennas are highly integrated and specific solutions that are complex to manufacture at high costs.

SUMMARY

It is thus the object of the invention to provide a multi-band antenna as well as a mobile communication base station, which can be integrated into the antenna entirely or in major parts and that is modular and has low manufacturing costs.

For this purpose, a multi-band antenna, in particular for a mobile communication base station is provided. The multi-band antenna comprises first radiators for a first frequency band, second radiators for a second frequency band, a frame and at least one insert. The frame comprises a frame reflector surface, the first radiators are mounted to the frame, and the frame defines at least one window for receiving the at least one insert. The insert comprises a base having an insert reflector surface, the second radiators are mounted to the insert, and the base is located in the at least one window. The frame reflector surface and the insert reflector surface together form a common reflector for the first radiators.

By realizing that a common reflector may be made of two separate surfaces, it became possible to mount the radiators for different frequency bands on different part to achieve a highly modular system that is easy to manufacture.

For example, the frame reflector surface and the insert reflector surfaces are parallel to each other. Further, the first radiators may form an array.

The insert can contain in the base the electronic components serving as components of a base station as known in the art, in particular at least the receive- and transmit modules of a base station as known in the art.

The frequencies of the first frequency band are in particular lower than frequencies of the second frequency band.

The frame and/or the base may be made out of one or more metal sheets.

In an aspect of the invention, the window is located between at least two of the first radiators and/or the window is an opening in the frame reflector surface. The window may also be an opening in the top plate. This way, the first radiators and the second radiators may be arranged in an interleaving fashion.

In order to improve radiation characteristics, the second radiators extend above the common reflector on the same side as the first radiators and/or the second radiators are arranged in an array on the base.

In an embodiment of the invention, the frame reflector surface and the insert reflector surface lie in the same plane or are offset from one another, the offset being smaller than a tenth of a wavelength of the average wavelength of the first frequency band. Thus, the requirements on manufacturing tolerances can be low.

For a simple construction, the frame may comprise two parallel stringers extending in a longitudinal direction, wherein the at least one window is located between the stringers.

In an aspect, the first radiators are arranged on the stringers, in particular wherein the first radiators are equally spaced along each of the stringers and/or the first radiators of the two stringers are directly opposite one another, leading to a compact design.

To improve the radiation characteristics, additional radiators may be mounted on the stringers, in particular wherein the additional radiators extend the array of the second and/or third radiators on the insert.

The additional radiators may be of the same type as the second radiators.

In an embodiment, the frame comprises at least two bridges connecting the stringers in a transverse direction, wherein the at least one window is surrounded by the stringers and adjacent ones of the at least two bridges, leading to a robust construction.

In order to easily allow two inserts in the frame, the frame may comprise three bridges, two of the bridges being arranged on opposite ends of the frame in the longitudinal direction and the third bridge being arranged between the ends of the frame defining a first window and a second window, in particular wherein the first radiators located in the region of the third bridge are arranged closer together in the transverse direction than the other first radiators.

For providing three different frequency bands, the antenna may comprise two inserts located in the first and second window, respectively, wherein the second radiators for the second frequency band are mounted to one of the two inserts and third radiators for a third frequency band are mounted to the other one of the two inserts. The inserts can also provide in the base the function, at least partially, of the transceiver modules for the second and the third frequency bands that is typically performed by the base station in the state of the art.

In particular, both inserts have a base and a reflector surface as explained above. The common reflector for the first radiators is formed by the reflector surfaces of the frame and of the two inserts.

In an embodiment of the invention the frame, in particular the stringers and/or bridges, comprises a top plate having the frame reflector surface and a side wall bordering the window, wherein the side wall is galvanically connected with the top plate, and wherein the base of the insert is coupled capacitively with the side wall. This way, a simple but efficient design is achieved.

The side walls and top plate may be a single piece, for example a pressed and/or bent metal sheet.

In order to improve the functionality of the common reflector, the base may comprise a top plate having the insert reflector surface and a coupling wing galvanically connected to the top plate of the insert, in particular extending from the top plate of the insert, wherein the coupling wing extends parallel to the side wall of the frame.

In an aspect, the coupling wing is connected to the base only at the top side of the insert and/or the coupling wing and the side wall of the frame have a parallel section, the length of the parallel section in direction of radiation, i.e. upwards or downwards, being approximately one quarter of a wavelength of the average wavelength of the first frequency band, improving the functionality of the common reflector even further.

In particular, the distance between the frame and the coupling wing is kept small enough to achieve a strong capacitively coupling, which will enhance the operation of the different parts of the resulting reflector as one common reflector.

In an embodiment, the frame comprises a bottom plate, wherein the bottom plate is fixed to the side wall and to the top plate, in particular wherein the bottom plate and the top plate are electrically insulated from one another at the connection of the top plate and bottom plate, leading to a very cost efficient design.

In order to efficiently mount the insert in the window, the insert may comprise a support plate, wherein the base is fixed to the support plate, and wherein the insert is fixed to the frame by the support plate, in particular wherein the support plate is fixed to the bottom plate.

In an aspect of the invention, the insert comprises an electronic component, in particular an amplifier and/or transceiver, connected to the second radiators.

For above purpose, a mobile communication base station is further provided. The base station comprises an antenna as explained above, in particular wherein the base station comprises an amplifier for the first radiators separate from the antenna.

The features and advantages discussed with respect to the antenna also apply to the base station and vice versa.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
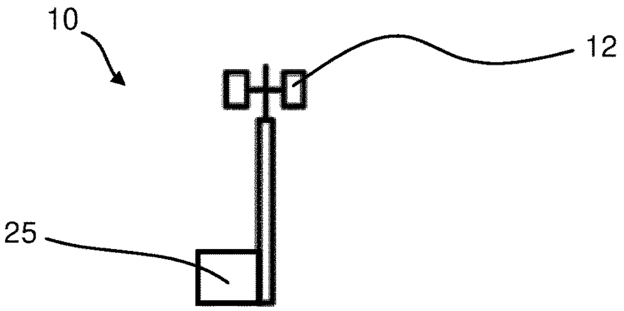
FIG. 1: shows a mobile communication base station according to the invention with a multi-band antenna according to the invention.

FIG. 1 shows a mobile communication base station 10 having at least one multi-band antenna 12.

Figure 2:
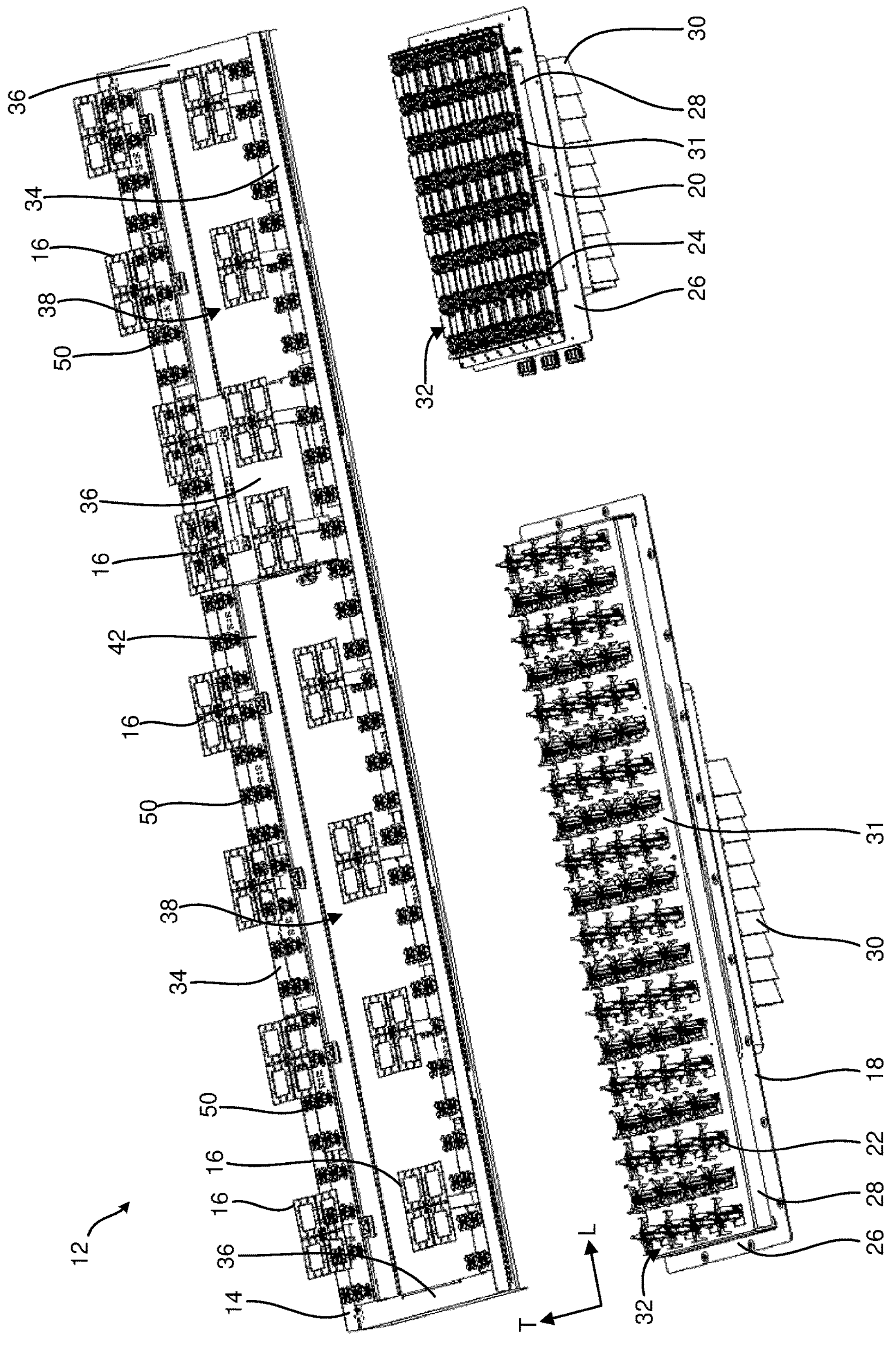
FIG. 2: shows the multi-band antenna according to FIG. 1 in an exploded view.

The multi-band antenna 12 is shown in FIG. 2 in an exploded view and comprises three parts, namely a frame 14 with first radiators 16 and two inserts 18, 20 with second radiators 22 and third radiators 24, respectively.

Only for the sake of clarity, the inserts 18, 20 are called second insert 18 and third insert 20 in the following according to the radiators 22, 24 mounted to them. Thus, as the first radiators 16 are mounted on the frame 14, no first insert exists.

The first radiators 16, the second radiators 22 and the third radiators 24 are designed to transmit and receive radiofrequency radiation in a first, second or third frequency band, respectively.

The frequencies of the first frequency band are lower than the frequencies of the second frequency band. The frequencies of the second frequency band are lower than the frequencies of the third frequency band.

For example, the first frequency band has a range of 690 to 960 MHZ, the second frequency band has a range of 1.9 to 2.2 GHz and the third frequency band has a range of 2.5 to 2.7 GHz.

The base station 10 may comprise an amplifier 25 for the first radiators 16. Thus, the first radiators 16 are connected to the amplifier 25 electrically, in particular by a feeder cable.

The second and third insert 18, 20 both comprise a support plate 26, a base 28 and at least one electronic component 30.

The base 28 is mounted to the support plate 26 on the top side of the support plate 26.

The support plate 26 extends laterally beyond the base 28, forming a flange.

The terms “top”, “bottom”, “up”, “down” or the like are used with reference to the radiation direction of the multi-band antenna 12 and not to an orientation of the multi-band antenna 12 when mounted in the base station 10.

The base 28 has a top plate 31 with a top surface on its top side, called insert reflector surface 32 in the following. The insert reflector surface 32 is in particular parallel to the support plate 26.

The second radiators 22 and third radiators 24 are mounted to the base 28 of the respective insert 18, 20 and extend from the respective insert reflector surface 32 upwards.

The second radiators 22 form an array above the insert reflector surface 32. Likewise, the third radiators 24 form an array above the insert reflector surface 32.

The electronic component 30 may be a transceiver comprising at least one transmit amplifier and at least one receive amplifier. The transceiver is electrically connected to the second radiators 22 or third radiators 24, respectively, in particular by conductors.

The electric component 30 is mounted to the support plate 26 on the bottom side of the support plate 26. Thus, the second insert 18 and the third insert 20 are active antenna arrays.

Figure 3:
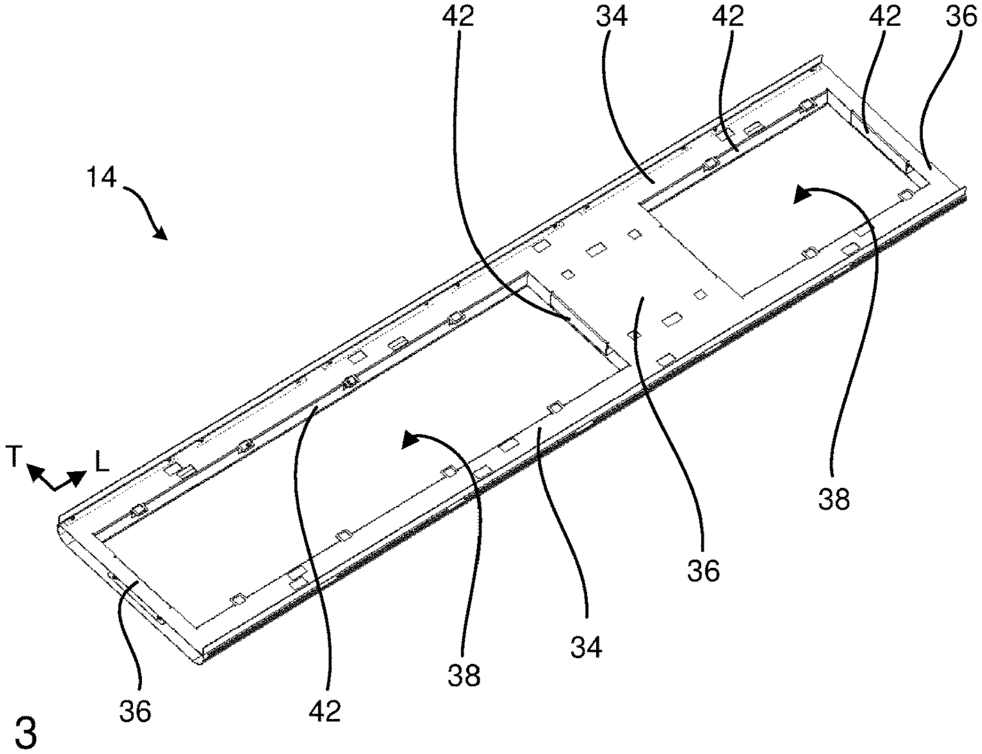
FIG. 3: shows a perspective view of a frame of the multi-band antenna according to FIG. 2, FIG. 4: shows a side view of the frame of FIG. 3 onto one end.

FIG. 3 shows the frame 14 without first radiators 16 in a perspective view.

The frame 14 comprises two stringers 34 extending in a longitudinal direction L and three bridges 36 extending in a transverse direction T orthogonal to the longitudinal direction L. The longitudinal direction L as well as the transverse direction T are in particular orthogonal to the radiation direction of the antenna 12.

The stringers 34 and the bridges 36 are hollow and may or may not be separate parts from one another.

The stringers 34 are parallel to one another and at each of the ends in the longitudinal direction L, one of the bridges 36 is provided, connecting the two stringers 34.

The third bridge 36 is provided between the ends in the longitudinal direction L and also connect the stringers 34.

Thus, the stringers 34 and the bridges 36 surround two volumes, called windows 38 in the following.

The windows 38 extend in the transverse direction T between the two stringers 34 and in the longitudinal direction L between the third bridge 36 and the respective one of the bridges 36 at the ends of the stringers 34.

Thus, the frame 14 defines two windows 38, namely a first window 38 and a second window 38.

Forming the stringers 34 and bridges 36, the frame 14 has a top plate 40, side walls 42 and a bottom plate 44.

The upper surface of the top plate 40 is a reflector surface called frame reflector surface 46 in the following.

Thus, the windows 38 can also be seen as openings in the frame reflector surface 32 and the top plate 40 that are bordered by the side walls 42.

The outer contour of the base 28 of the inserts 18, 20 correspond to the contours of the windows 38 corresponding to or designated for the respective insert 18, 20. The support plates 26, however, have larger dimensions as the corresponding window 38 for mounting purposes.

Figure 4:
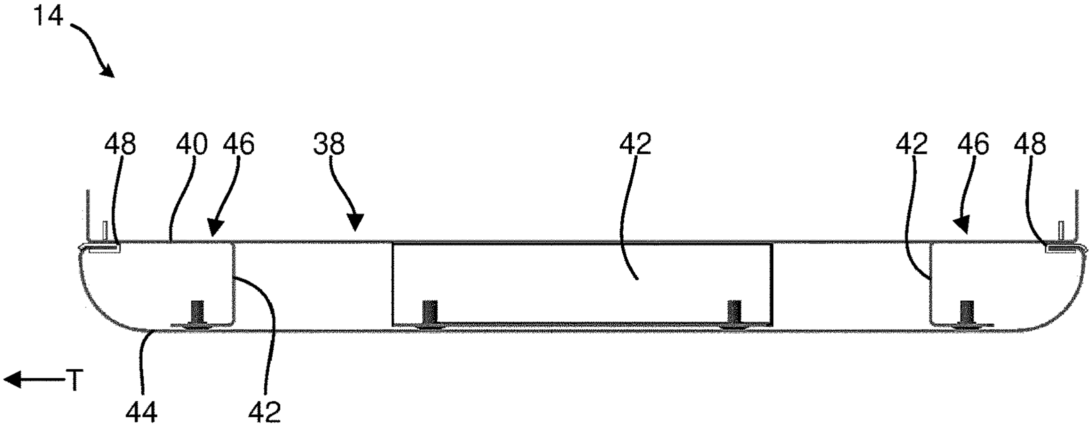

FIG. 4 shows a side view onto the frame 14 in the longitudinal direction L.

In the shown example, the frame 14 comprises two pressed and/or bend metal sheets.

The top plate 40 and the side walls 42 are formed by the same piece, thus one of the pressed and/or bend metal sheets.

The bottom plate 44 is made from the other metal sheet.

The side walls 42 are bent from the top plate 40 and are fixed, for example bolted, to the bottom plate 44. Thus, the side walls 42 are galvanically connected to the top plate 40 and fixed to the bottom plate 44.

Further, on the outer edge in the transverse direction T, the top plate 40 and the bottom plate 44 are connected to one another.

To this end, a holder 48 made from an electrically insulating material is fixed to the bottom side of the top plate 40.

In the shown embodiment, the holder 48 has a pocket in form of a slit which is open to the outer side in the transverse direction T.

The bottom plate 44 is bent such that the edges of the bottom plate 44 extending in the longitudinal direction L are received in the respective holder 48. This way, the bottom plate 44 is connected to the top plate 40 in an electrically insulated manner.

Turning back to FIG. 2, it can be seen that the first radiators 16 are mounted to the top plate 40 and extending upwards forming an array.

More precisely, the first radiators 16 are located on the stringers 34 equally spaced in the longitudinal direction L. Further, for each first radiator 16 on one of the stringers 34, there is a counterpart first radiator 16 on the other stringer 34 in the transverse direction T. Thus, all of the first radiators 16 of both stringers 34 are directly opposite one another with respect to a middle line in the longitudinal direction L.

In other words, the windows 38 are between pairs of first radiators 16 in the transverse direction T.

Two pairs of first radiators 16 are located in the region of the third bridge 36. The first radiators 16 of each pair are located closer together in the transverse direction than the other first radiators 16 located in regions of the windows 38.

Further, additional radiators 50 are mounted on the stringers 34, in particular on the top plate 40 above the frame reflector surface 32. The additional radiators 50 may be arranged between the first radiators 16 also in an equidistant spacing in the longitudinal direction L. The spacing is, however, shorter than the spacing between the first radiators 16.

The additional radiators 50 may be the same as the second radiators 22 or the third radiators 24 or may be designed for the same frequency band as these radiators 22, 24. It is possible that the additional radiators 50 in the region of one of the first windows 38, designated for the second insert 18, are the same as the second radiators and that the additional radiators 50 in the region of the second window 38, designated for the third insert 20, are the same as the third radiators 24.

The additional radiators 50 are not connected to any transmit amplifier 25, 30 and may be used for the reception of signals only or as dummy radiators.

Figure 5:
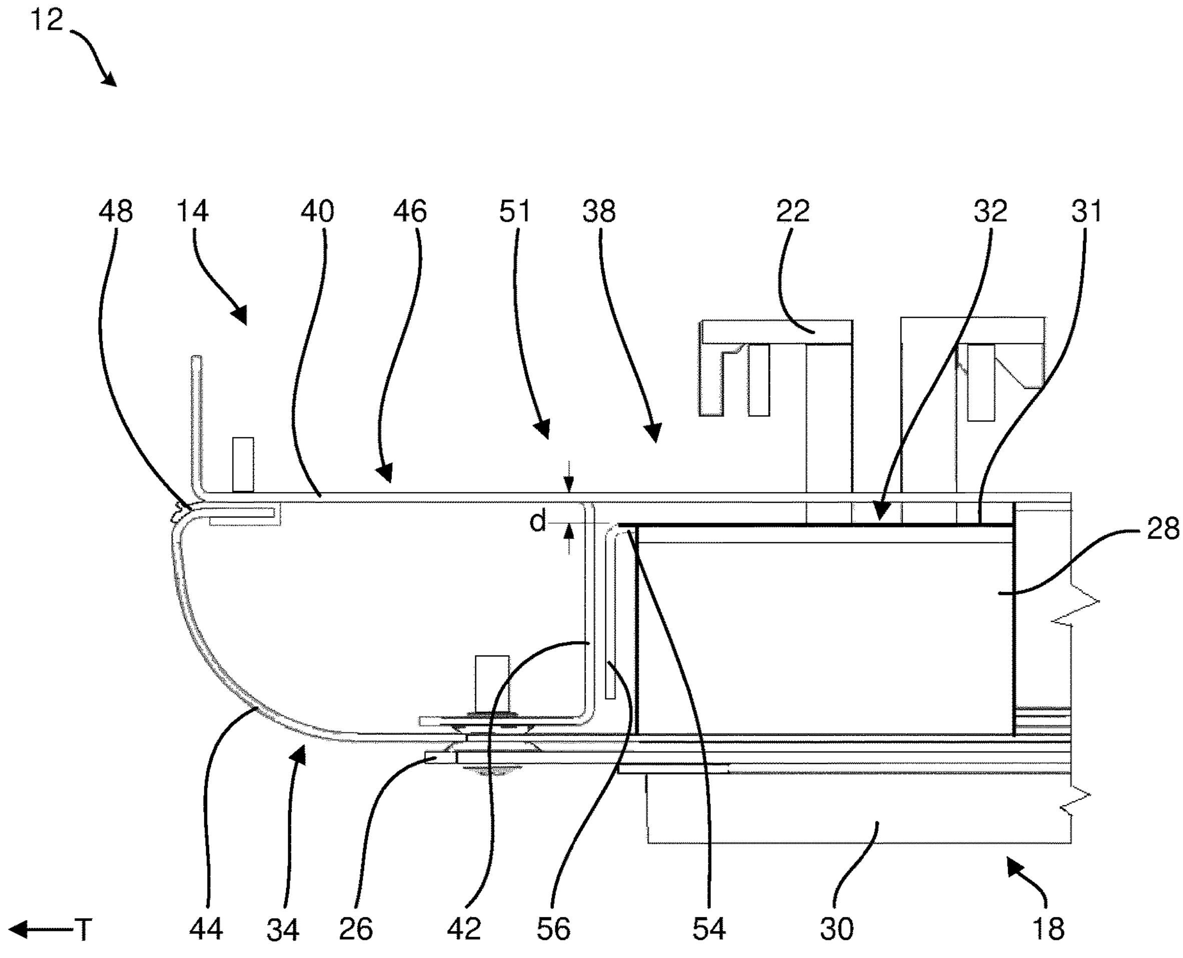
FIG. 5: shows a part of a cross-section of the assembled multi-band antenna according to FIG. 2.

FIG. 5 shows the multi-band antenna 12 in a partial side view, wherein the inserts 18, 20 are mounted in the respective corresponding window 38.

For the sake of simplicity, the first radiators 16 and the additional radiators 50 on the frame 14 are not shown.

The first insert 18 is visible in FIG. 5 so that only this insert 18 is referred to in the following. However, the description is also applicable for the third insert 20.

The second insert 18 and the third insert 20 is inserted into the window 38 from the bottom side upwards.

The support plate 26 of the second and third inserts 18, 20 are fixed to the bottom plate 44 of the frame 14. This may be done by the same connection, in particular using the same bolt, that is used to connect the side walls 42 to the bottom plate 44.

Further, the second radiators 22 (and in case of the third insert 20, the third radiators 24) extend out of the window 38 upwards, thus above the plane defined by the frame reflector surface 46.

The frame reflector surface 46 and the insert reflector surface 32 together form a common reflector 51 for the first radiators 16 and optionally the second radiators 22 or third radiators 24, respectively.

Thus, the second radiators 22 (and also the third radiators 24) extend above the common reflector 51 on the same side as the first radiators 16.

The frame reflector surface 46 of the frame 14 and the insert reflector surface 32 of the inserts 18, 20 are parallel to one another.

As can be seen in FIG. 5, the frame reflector surface 46 and the insert reflector surface 32 may be offset from one another by an offset having a distance d.

The distance d may be smaller than $\frac{1}{10}$ of a wavelength of the average wavelength of the first frequency band.

It is of course possible that the frame reflector surface 46 and the insert reflector surface 32 are in the same plane.

As can be seen in FIG. 5, the base 28 of the second and third insert 18 comprises coupling wings 54.

For example, for each side wall 42 of the frame 14 bordering a specific window 38 a coupling wing 54 is provided at the respective base 28.

The coupling wing 54 has a vertical coupling section 56 located between the side wall 42 and the rest of the base 28.

The coupling wing 54 is connected on one of its vertical ends to the rest of the base 28, in particular at the top side of the base 28. Thus, a galvanic connection between the coupling section 56 and the insert reflector surface 32 is established.

In the shown embodiment, the coupling wing 54 extends from the top plate 31 horizontally outwards and then vertically to form the coupling section 56.

The coupling section 56 runs parallel to the side wall 42 so that the coupling wing 54 and the respective side wall 42 have a parallel section which has a length in the vertical direction of, for example, a quarter of a wavelength of the average wavelength of the first frequency band. Thus, the side wall 42 and the coupling wing 54 and thus the base 28 are capacitively coupled resulting in a capacitive coupling between the insert reflector surface 32 and the frame reflector surface 46.

By realizing a common reflector 51 composed of a surface of the frame and the surfaces of the inserts 18, 20, it is possible to mount the first radiators 16 on the one hand and the second or third radiators 22, 24 on the other hand on separate parts, namely the frame 14 and the bases 28. This drastically simplifies the assembly and allows for a modular design of the multi-band antenna 12.

Further, by using the coupling wing 54 and thus the capacitive coupling between the frame reflector surface 46 and the insert reflector surfaces 32, the effect of the common reflector 51 is enhanced.

The invention claimed is:

1. A multi-band antenna, in particular for a mobile communication base station, comprising first radiators for a first frequency band, second radiators for a second frequency band, a frame and at least one insert, wherein the frame comprises a frame reflector surface, the first radiators are mounted to the frame, and the frame defines at least one window for receiving the at least one insert, wherein the at least one insert comprises a base having an insert reflector surface, the second radiators are mounted to the at least one insert, and the base is located in the at least one window, wherein the frame reflector surface and the insert reflector surface together form a common reflector for the first radiators, characterized in that the frame comprises two parallel stringers extending in a longitudinal direction (L), wherein the at least one window is located between the stringers, characterized in that the frame comprises at least two bridges connecting the stringers in a transverse direction (T), wherein the at least one window is surrounded by the stringers and adjacent ones of the at least two bridges, characterized in that the frame, in particular the stringers and/or the at least two bridges, comprises a top plate having the frame reflector surface and at least one side wall bordering the window, wherein the at least one side wall is galvanically connected with the top plate, and wherein the base of the at least one insert is coupled capacitively with the at least one side wall, characterized in that the frame comprises a bottom plate, wherein the bottom plate is fixed to the at least one side wall and to the top plate, in particular wherein the bottom plate and the top plate are electrically insulated from one another at the connection of the top plate and bottom plate, and characterized in that the at least one insert comprises a support plate, wherein the base is fixed to the support plate, and wherein the at least one insert is fixed to the frame by the support plate, in particular wherein the support plate is fixed to the bottom plate.

2. The antenna according to claim 1, characterized in that the window is located between at least two of the first radiators and/or that the window is an opening in the frame reflector surface.

3. The antenna according to claim 1, characterized in that the second radiators extend above the common reflector on the same side as the first radiators and/or wherein the second radiators are arranged in an array on the base.

4. The antenna according to claim 1, characterized in that the frame reflector surface and the insert reflector surface lie in the same plane or are offset from one another, the offset being smaller than a tenth of a wavelength of the average wavelength of the first frequency band.

5. The antenna according to claim 1, characterized in that the first radiators are arranged on the stringers, in particular wherein the first radiators are equally spaced along each of the stringers and/or the first radiators of the two stringers are directly opposite one another.

6. The antenna according to claim 1, characterized in that additional radiators are mounted on the stringers, in particular wherein the additional radiators extend an array of the second radiators on the at least one insert.

7. The antenna according to claim 1, characterized in that the at least one insert comprises an electronic component, in particular an amplifier and/or transceiver, connected to the second radiators.

8. The antenna according to claim 1, characterized in that the frame comprises three bridges, two of the bridges being arranged on opposite ends of the frame in the longitudinal direction (L) and the third bridge being arranged between the ends of the frame defining a first window and a second window, in particular wherein the first radiators located in the region of the third bridge are arranged closer together in the transverse direction (T) than the other first radiators.

9. The antenna according to claim 8, characterized in that the antenna comprises two inserts located in the first and second window, respectively, wherein the second radiators for the second frequency band are mounted to one of the two inserts and third radiators for a third frequency band are mounted to the other one of the two inserts.

10. The antenna according to claim 9, characterized in that additional radiators are mounted on the stringers, in particular wherein the additional radiators extend an array of the second radiators and/or an array of the third radiators on the at least one insert.

11. The antenna according to claim 8, characterized in that the base comprises a top plate having the insert reflector surface and a coupling wing galvanically connected to the top plate of the insert, in particular extending from the top plate of the at least one insert, wherein the coupling wing extends parallel to the at least one side wall of the frame.

12. The antenna according to claim 11, characterized in that the coupling wing is connected to the base only at the top side of the at least one insert and/or that the coupling wing and the at least one side wall of the frame have a parallel section, the length of the parallel section in direction of radiation being approximately one quarter of a wavelength of the average wavelength of the first frequency band.

13. A mobile communication base station comprising:

a multi-band antenna comprising first radiators for a first frequency band, second radiators for a second frequency band, a frame and at least one insert, wherein the frame comprises a frame reflector surface, the first radiators are mounted to the frame, and the frame defines at least one window for receiving the at least one insert, wherein the at least one insert comprises a base having an insert reflector surface, the second radiators are mounted to the at least one insert, and the base is located in the at least one window, wherein the frame reflector surface and the insert reflector surface together form a common reflector for the first radiators, characterized in that the frame comprises two parallel stringers extending in a longitudinal direction (L), wherein the at least one window is located between the stringers, characterized in that the frame comprises at least two bridges connecting the stringers in a transverse direction (T), wherein the at least one window is surrounded by the stringers and adjacent ones of the at least two bridges, characterized in that the frame, in particular the stringers and/or the at least two bridges, comprises a top plate having the frame reflector surface and at least one side wall bordering the window, wherein the at least one side wall is galvanically connected with the top plate, and wherein the base of the at least one insert is coupled capacitively with the at least one side wall, characterized in that the frame comprises a bottom plate, wherein the bottom plate is fixed to the at least one side wall and to the top plate, in particular wherein the bottom plate and the top plate are electrically insulated from one another at the connection of the top plate and bottom plate, and characterized in that the at least one insert comprises a support plate, wherein the base is fixed to the support plate, and wherein the at least one insert is fixed to the frame by the support plate, in particular wherein the support plate is fixed to the bottom plate, and an amplifier for the first radiators separate from the multi-band antenna.

* * * * *